US00RE45455E

(19) United States
(12) Reissued Patent
Gunnersen et al.

(10) Patent Number: US RE45,455 E
(45) Date of Reissued Patent: Apr. 7, 2015

(54) HEARING AID EAR WAX GUARD AND A METHOD FOR ITS USE

(71) Applicant: Widex A/S, Lynge (DK)

(72) Inventors: Finn Gunnersen, Ballerup (DK); Jan Topholm, Holte (DK)

(73) Assignee: Widex A/S, Lynge (DK)

(21) Appl. No.: 14/026,702

(22) Filed: Sep. 13, 2013

Related U.S. Patent Documents

Reissue of:
(64) Patent No.: 8,019,106
Issued: Sep. 13, 2011
Appl. No.: 12/250,940
Filed: Oct. 14, 2008

U.S. Applications:
(62) Division of application No. 10/926,005, filed on Aug. 26, 2004, now Pat. No. 7,443,993, which is a division of application No. 09/743,316, filed as application No. PCT/DK99/00022 on Jan. 15, 1999, now Pat. No. 6,795,562.

(30) Foreign Application Priority Data

Jul. 10, 1998 (DK) ..... 1998 00921

(51) Int. Cl.
*H04R 25/00* (2006.01)

(52) U.S. Cl.
CPC ..... *H04R 25/654* (2013.01)

(58) Field of Classification Search
CPC .. H04R 2460/17; H04R 25/60; H04R 25/652; H04R 25/654
USPC ..... 381/325
See application file for complete search history.

(56) References Cited

U.S. PATENT DOCUMENTS

| | | | |
|---|---|---|---|
| 1,830,198 | A | 8/1930 | French |
| 2,266,874 | A | 9/1939 | Larson |
| 3,017,879 | A | 10/1958 | Sapit et al. |
| 3,176,114 | A | 3/1965 | Kneisley |
| D241,475 | S | 9/1976 | Staub |

(Continued)

FOREIGN PATENT DOCUMENTS

| | | |
|---|---|---|
| DE | 415944 | 7/1925 |
| DE | 3603704 A1 | 8/1987 |

(Continued)

*Primary Examiner* — Brian Ensey
(74) *Attorney, Agent, or Firm* — Sughrue Mion, PLLC

(57) ABSTRACT

For the protection of an in-the-ear hearing aid against contamination by ear wax through the acoustic outlet port (34a) or a vent, a replaceable ear wax guard (36) is inserted in the aid and includes an essentially tubular element with a through-going cavity and an abutment collar in one end for sealing abutment against the hearing aid housing (31). For an easy and safe insertion and removal of the ear wax guard (36), an applicator is used, which in one end has a smooth pin for introduction in the through-going cavity of the ear wax guard (36) and in the other end a harpoon-shaped catch member. For mounting of the ear wax guard (36) a hose or tube member serving as acoustic outlet canal (34) is connected to an abutment collar (33) in abutment with the outside of hearing aid. The abutment collar is designed with oversize standard dimensions and adapted to an individually user-adapted hearing aid housing by preparation of its periphery edge.

27 Claims, 5 Drawing Sheets

(56) References Cited

U.S. PATENT DOCUMENTS

| | | | | | |
|---|---|---|---|---|---|
| D246,189 | S | | 10/1977 | Smith | |
| 4,296,829 | A | | 10/1981 | Pederson | |
| 4,349,082 | A | | 9/1982 | Gastmeier | |
| 4,443,668 | A | | 4/1984 | Warren | |
| 4,553,627 | A | | 11/1985 | Gastmeier et al. | |
| 4,706,778 | A | | 11/1987 | Topholm | |
| 4,840,249 | A | | 6/1989 | Birkholz et al. | |
| 4,870,689 | A | | 9/1989 | Weiss | |
| 4,879,750 | A | | 11/1989 | Nassler | |
| 4,972,488 | A | * | 11/1990 | Weiss et al. | 381/325 |
| 4,984,277 | A | | 1/1991 | Bisgaard et al. | |
| 4,987,597 | A | | 1/1991 | Haertl | |
| 5,099,947 | A | | 3/1992 | Guggenberger et al. | |
| 5,105,904 | A | | 4/1992 | Olsen | |
| 5,209,757 | A | | 5/1993 | Krug et al. | |
| 5,278,360 | A | * | 1/1994 | Carbe et al. | 181/135 |
| 5,327,500 | A | | 7/1994 | Campbell | |
| 5,712,918 | A | * | 1/1998 | Yoest | 381/325 |
| 5,864,628 | A | * | 1/1999 | Posen et al. | 381/325 |
| 5,887,070 | A | | 3/1999 | Iseberg et al. | |
| 5,970,157 | A | | 10/1999 | Yoest | |
| 6,000,492 | A | | 12/1999 | Puthuff et al. | |
| 6,164,409 | A | | 12/2000 | Berger | |
| 6,205,227 | B1 | | 3/2001 | Mahoney | |
| 6,592,280 | B2 | | 7/2003 | Petrich et al. | |
| 6,795,562 | B1 | | 9/2004 | Gunnersen et al. | |
| 7,443,993 | B2 | | 10/2008 | Gunnersen et al. | |
| 7,447,325 | B2 | | 11/2008 | Bren et al. | |
| D587,369 | S | | 2/2009 | Hickok | |
| D588,697 | S | | 3/2009 | Hickok | |
| D601,251 | S | | 9/2009 | Horton et al. | |
| D603,045 | S | | 10/2009 | Petersen | |
| D612,048 | S | | 3/2010 | Baynham | |
| D612,052 | S | | 3/2010 | McCollam et al. | |
| D617,457 | S | | 6/2010 | Baker | |
| D619,251 | S | | 7/2010 | Justiniano-Garcia et al. | |
| D625,818 | S | | 10/2010 | Khalil et al. | |
| D632,793 | S | | 2/2011 | Gunnersen | |
| 8,019,106 | B2 | | 9/2011 | Gunnersen et al. | |
| D654,591 | S | | 2/2012 | Gunnersen | |

FOREIGN PATENT DOCUMENTS

| | | | |
|---|---|---|---|
| DE | 3616637 | A1 | 11/1987 |
| DE | 4232317 | A1 | 5/1993 |
| EP | 0310866 | A1 | 4/1989 |
| EP | 0352954 | A2 | 1/1990 |
| EP | 0724377 | A1 | 7/1996 |
| FR | 2347158 | | 11/1977 |
| WO | 8404016 | | 1/1984 |

* cited by examiner

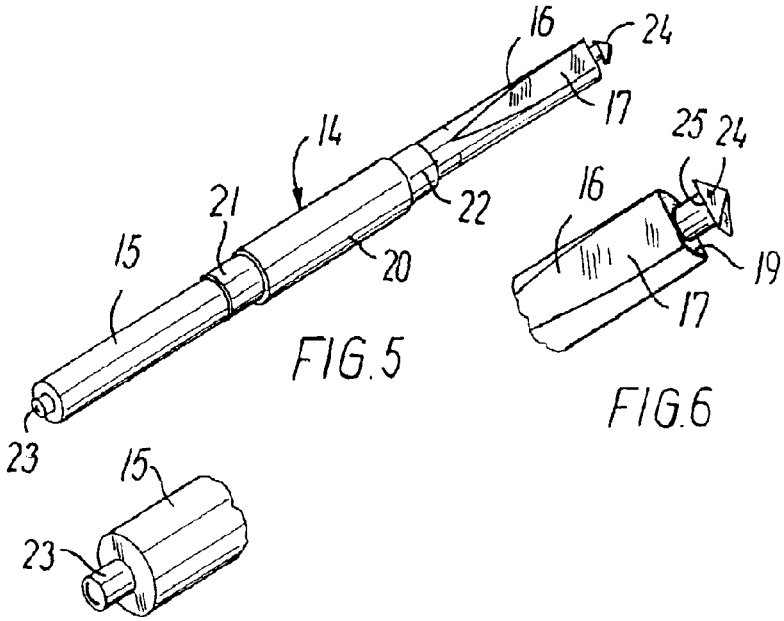
FIG. 5
FIG. 6
FIG. 7
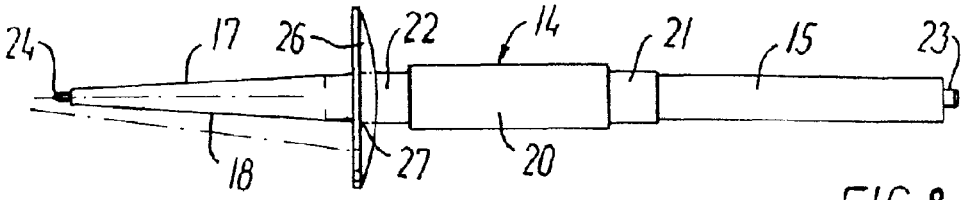
FIG. 8
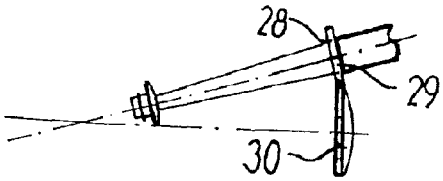
FIG. 9

HEARING AID EAR WAX GUARD AND A METHOD FOR ITS USE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This is a divisional of U.S. application Ser. No. 10/926,005, filed Aug. 26, 2004, which is a divisional of application Ser. No. 09/743,316 filed Jan. 9, 2001, now U.S. Pat. No. 6,795,562, which is a national stage entry of PCT/DK99/00022 filed Jan. 15, 1999, which claims priority from Danish Application PA199800921 filed Jul. 10, 1998, the disclosures of which are incorporated by reference herein.

BACKGROUND OF THE INVENTION

The present invention relates to a replaceable ear wax guard for placement in an opening in a wall part of a housing of an in-the-ear hearing aid designed for positioning in the ear canal, comprising an essentially tubular element partially closed in one end by an ear wax retaining barrier.

In in-the-ear hearing aids where the hearing aid housing is placed within the user's ear canal with the acoustic outlet port facing the inner ear and connected to the telephone unit of the hearing aid, it is a well-known problem that the acoustic outlet passage is exposed to contamination with cerumen or ear wax which may lead to clogging of the acoustic outlet passage with consequently reduced sound reproduction. At worst, there may be a risk for the ear wax to enter the hearing apparatus housing and result in damage to the electrical components of the hearing aid.

In order to avoid this problem, it is known from U.S. Pat. No. 4,972,488 to arrange a replaceable ear wax barrier, which can at the same time provide a dampening of the acoustic response, in the acoustic outlet passage in the apparatus housing. In this known design, the ear wax barrier is formed as a screw plug the arrangement of which presupposes a thread being provided in the acoustic outlet passage, and the ear wax barrier is in the end facing outward at the insertion by screwing, designed with incisions for providing a slot for a screw driver. The barrier effect for retaining of ear wax is obtained by providing inward projections in a through-going cavity in the screw plug.

As a consequence of the very small dimensions where the acoustic outlet passage has typically a diameter of about 1 mm, the screw plug form entails that insertion and removal of the ear wax guard is a rather difficult operation, especially for weak-sighted hearing aid users, and the inward projections forming a kind of maze in the through-going cavity do not provide full security against migration of ear wax. Furthermore, the screw plug design cannot be used in in-the-ear hearing aids of the conventional type where the acoustic outlet passage is formed by a short hose or tube member connecting the telephone unit with an acoustic output port in the wall of the hearing aid housing.

Furthermore, the international patent application WO 84/04016 discloses an ear wax guard in the form of an outwardly closed plug with a disc-shaped head which at the placement of the plug covers the acoustic outlet port of the aid housing. In the plug under the disc-shaped head, there are provided radial acoustic passageways in connection with a longitudinal acoustic passageway opening in the plug end introduced in the aid housing. To secure a sufficient acoustic passage, the plug is designed such that the disc-shaped head is kept at a distance from the outside of the aid housing which entails a risk, albeit reduced, of migration of ear wax under the plug and in the narrow radial acoustic passageways. As a consequence of the smooth disc-shaped head, the insertion and removal of the plug is also in this case a difficult operation.

In a hearing aid known from U.S. Pat. No. 4,553,627, an essentially mushroom-shaped ear wax guard with a crossing acoustic passage is mounted with snap engagement in a metal ring inserted in the acoustic outlet port of the hearing aid housing.

In published European application EP 0724 377 A1, an ear wax barrier of the kind defined above is disclosed, which is inserted by press-fitting in the receiver tube of a hearing aid with frictional engagement between a lip provided by the wax barrier and the receiver tube. Thereby, removal or dislodging of the wax barrier will be resisted. Whereas the operation of removal is not described in the document the only possibility would appear to seize a projecting collar formed at the distal end of the wax barrier by a suitable instrument, such as a knife, a tongue or a pair of tweezers.

With this prior art as background, it is the object of the invention to provide a replaceable ear wax guard of the stated type with a simple and low-cost design suited for all kinds of in-the-ear hearing aids and which by use of an applicator can be mounted in and removed from the aid housing in a simple way.

SUMMARY OF THE INVENTION

For this purpose, the ear wax guard according to the invention is characterized in that the tubular element provides an essentially circular cylindrical through-going cavity with a smooth inner side and is connected in the opposite end to a surrounding abutment collar forming, in the position of use of the ear wax guard, a sealing lip against said wall part around said opening, the tubular element being made by an elastically yielding material which, by introduction of an applicator into the tubular element, is engageable by a catch member of said applicator for removal of the ear wax guard from an acoustic outlet port or vent formed by said opening.

As a consequence of the simple design as a short tubular element with a surrounding abutment collar in the end facing inward at the insertion, the ear wax guard according to the invention is inexpensive to manufacture in a large number by molding of the elastically yielding material, which can typically be silicone rubber or a thermoplastic elastomer. A further contribution to this is the positioning of the ear wax retaining barrier in one end of the tubular element which when introduced is led into the acoustic outlet canal. The merely partial opening of this end of the tubular element can be obtained by designing the guard as a kind of screen and thus can assure a good sound transmission.

Advantageous features and embodiments of the ear wax guard are described below. In a particularly advantageous embodiment, in particular for use in connection with CIC hearing aids, the abutment collar is provided with a convex outside and a concave or faintly conical underside to provide said sealing lip at its peripheral edge. Thus, the user comfort is improved as the ear wax guard essentially follows the outer contour of the aid housing.

As a consequence of the sealing engagement of the abutment collar of the ear wax barrier against the hearing aid housing, the abutment collar, which can preferably be provided with a relatively thin and soft edge, fitting snugly to the surrounding outside of the housing with a very even transition, it is avoided that when inserting or removing the hearing aid, the abutment collar causes any inconvenience or damage to the ear canal.

As the removal of the wax barrier of the invention by seizing the edge of the abutment collar in a conventional way as known, e.g., from U.S. Pat. No. 4,553,627, is not possible, the invention further relates to an applicator for placement and replacement of the ear wax guard in an opening in a wall part of a housing of an in-the-ear hearing aid designed for positioning in the ear canal, comprising an essentially rod-shaped member provided in one end with first engaging means fitting into the tubular element of the ear wax guard for insertion of the ear wax guard and, in the opposite end, with second engaging means for removal of the ear wax guard.

In a prior art design of a similar applicator disclosed in U.S. Pat. No. 4,972,488, the first engaging means is formed with projecting fins engageable with recessed slots in the inner side of the tubular element of the wax guard, whereas the second engaging means projecting members with fins engageable with the projecting collar of the wax guard.

According to the invention, such an applicator is characterized in that said first engaging means comprises a smooth pin fitting into the smooth wall inner side of the tubular element of the ear wax guard, whereas said second engaging means comprises a catch member engageable with the elastically yielding material of the tubular element at said smooth wall inner side by introduction of said opposite end of the applicator into the tubular element.

By this applicator design, the insertion of the ear wax guard in the acoustic outlet port and the removal herefrom in connection with the replacement of the ear wax guard can be made in a simple way and with a high degree of security even by weak-sighted users, the different design of the two ends of the applicator for insertion and removal, respectively, contributing to the easy operation.

Advantageous embodiments of the applicator are also described below and in the appended claims. Thus, according to a preferred embodiment, the essentially cylindrical and wedge-shaped portion of the applicator is separated by an intermediate piece with a cross section larger than said portion, and a magnifying lens having a bore is provided for attachment on said cylindrical or said wedge-shaped applicator portion in abutment against said intermediate piece.

By itself, the use of a magnifying lens in combination with a conventional screwdriver is known from French patent publication FR 2 347 158.

Thus, a further improvement of the operating security is obtained, especially for weak-sighted hearing aid users.

As from consideration of the visibility of the through-going cavity of the ear wax guard and the risk of pressing ear wax accumulated in the ear wax guard out through the ear wax retaining barrier at introduction of the applicator in the ear wax guard in connection with the removal hereof, the catch member may not cover a too large area, the use of the applicator, especially in ITE hearing aids where the acoustic outlet canal is designed as a hose or tube member guided from the output transducer of the aid all the way through to the acoustic outlet port in the wall of the housing, will entail a certain risk that such a hose or tube member and perhaps the ear wax guard itself at the pressing-in of the catch member is pressed into the hearing aid housing.

To encounter this risk, the invention relates in addition to a particularly designed in-the-ear hearing aid with a housing provided for positioning in the ear canal and having an essentially shell-shaped wall, in which in an end part meant for placement inside the ear canal an opening is provided to form an acoustic outlet port in connection with one end of hose or tube member serving as acoustic outlet canal, the other end of which is retained in an outlet port from an outlet transducer arranged in the housing or optionally a vent.

To obtain an improved security against the hose or tube member serving as acoustic outlet canal at the mounting or replacement of the ear wax guard being detached from its connection with the acoustic outlet port in the end part of the housing wall and pressed into the housing, the hearing aid according to the invention is characterized in that to permit placement and replacement of an ear wax guard as defined above by use of an applicator as likewise defined above without affecting the hose or tube member, said opening is provided in an annular abutment collar arranged in abutment with the outside of said wall end part. Appropriate embodiments of such a hearing aid are further described below.

Since the housing for in-the-ear hearing aids of the stated kind is usually designed with an individually adapted form according to the actual user's ear canal, the invention further relates to a method for manufacture of a hearing aid of the stated type which permits a production of the abutment collar for mounting of the ear wax guard in a standard design independent of the individual user adaptation of the form of the housing.

According to the invention, this method is characterized by the use of an abutment collar having overdimensions with respect to said end part of the housing wall, and that a flush transition of the abutment collar with the outside of said end part is provided by preparation of the peripheral edge of the abutment collar.

BRIEF DESCRIPTION OF THE DRAWINGS

The invention is further explained in the following with reference to the schematical drawings, wherein FIG. 5 is a perspective view of an embodiment of an insertion and removal applicator, FIGS. 6 and 7 show on a larger scale sections of the applicator in FIG. 5.

FIG. 8 shows an embodiment of an enlargement lens mounted on the applicator in FIG. 5, FIG. 9 shows an alternative design of the enlargement lens, FIG. 10 at a)-d) illustrates insertion and removal of the ear wax guard.

DETAILED DESCRIPTION OF THE INVENTION

Figure 1:
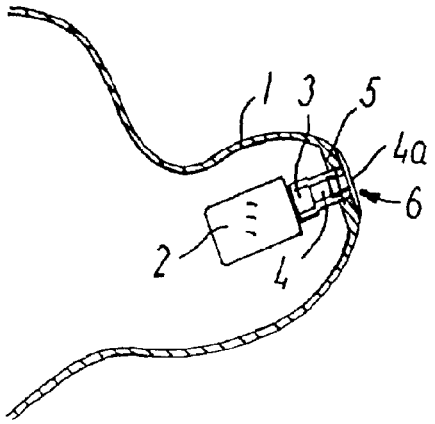
FIG. 1 is a sectional view of a part of the housing of an in-the-ear hearing aid, FIG. 2 a section of FIG. 1 on a larger scale.

FIG. 1 shows the portion 1 facing the inner ear, of the housing of an in-the-ear hearing aid designed for position in a user's ear canal. Of the internal components in the hearing aid only an outlet transducer is shown in the form of a telephone unit 2 with an output port 3 which through an acoustic outlet canal 4 formed by a hose member of plastics is connected to an acoustic outlet port 4a designed in an end wall part 5 of the housing portion 1. In order to avoid contamination of the interior of the housing portion 1 with cerumen or ear wax entering through the acoustic outlet canal 4, an ear wax guard 6 is placed herein.

Figure 2:
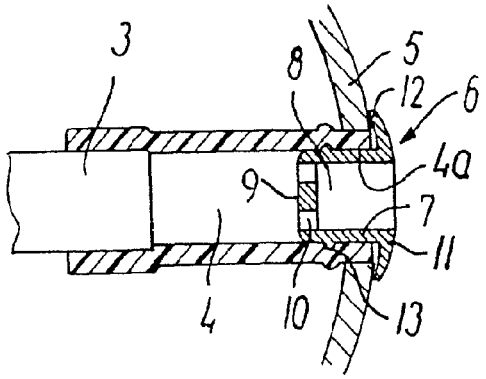
Figure 3:
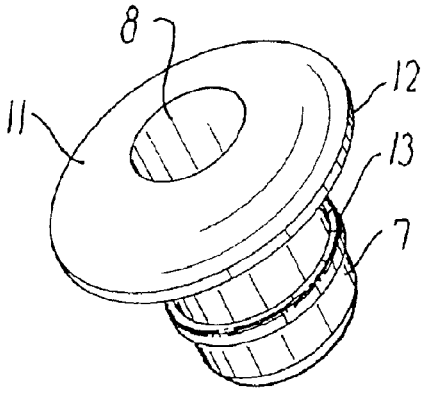
FIGS. 3 and 4 are perspective views of an embodiment of the ear wax guard.
Figure 4:
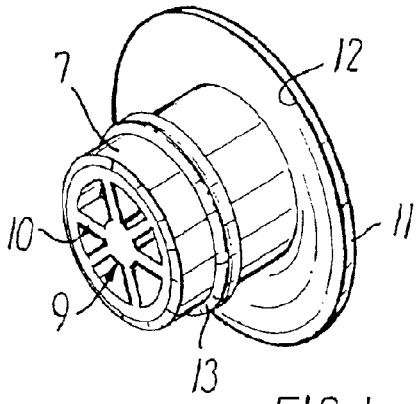

The embodiment shown in FIGS. 2-4 of the ear wax guard 6 is according to the invention designed as a short, essentially circular cylindrical tubular element 7 with a length and an outer diameter adapted to introduction into the acoustic outlet canal 4 with frictional fit.

A through-going also essentially circular cylindrical cavity 8 in the tubular element 7 is in one end, which by insertion in the acoustic outlet canal 4 is led into this, partially closed by an ear wax retaining barrier 9 which as shown in FIG. 4 may have the form of a screen with loops limited by radial threads 10.

In the opposite end the tubular element 7 is surrounded by an abutment collar 11 which in the inserted position is brought into sealing abutment against the end wall part 5 around the acoustic outlet port 4a. In the shown embodiment the abutment collar 11 has a convex outside and a concave or faintly conical underside, the peripheral edge of the collar forming a relatively thin and soft sealing lip 12 against the end wall part 5. Thus, a high degree of security is obtained against migration of ear wax under the periphery edge of the collar and the ear wax guard will in inserted position follow the contour of the aid housing which is of considerable importance as to comfort, especially at so called CIC aid which are placed in the innermost sensitive part of the ear canal.

The ear wax guard 6 is manufactured of elastic yielding material as e.g. silicone rubber or a thermoplastic elastomer and typical with an outer diameter of 1.25-1.5 mm and an inner diameter of the cavity 8 of about 1 mm.

For an improved securing of the ear wax guard 6 in the acoustic outlet canal 4, the tubular element 6 can on the outside be provided with means for frictional engagement, e.g. in the form of at least one circumferential bead 13.

An ear wax guard as shown and described can be placed not only in the acoustic outlet port of the hearing aid housing, but also in an opening facing the inner of the ear canal, in the hearing aid housing for a vent passage, which may have the purpose of preventing or reducing so called occlusion effects.

A means for use at insertion and removal of the ear wax guard 6 in FIGS. 2-4 comprises an essentially rod-shaped applicator 14 which in the embodiment shown in FIGS. 5-7 in one end has an essentially circular cylindrical portion 15 and in the other end an essentially wedge-shaped portion 16 formed by bevels 17 and 18 and with a flat rectangular end edge face 19. The end portions 15 and 16 are separated by an intermediate piece 20 which is connected with the end portions 15 and 16 through circular cylindrical transition portions 21 and 22, and the intermediate piece 20 has a cross-sectional dimension which is larger than the adjacent transition portions 21 and 22 as is further explained in the following.

At the free end of the circular cylindrical portion 15, the applicator 14 is provided with a smooth circular cylindrical pin 23 for insertion in the inner cavity 8 of the ear wax guard 6 in connection with the insertion of the ear wax guard in the acoustic outlet port 4. In the opposite end, the applicator 14 is provided with a harpoon-shaped pressing-in peak 24 projecting from the end edge surface 19 which with catch edges 25 forms a catch member for engagement with the wall inner side of the tubular element 7 of the ear wax guard 6 around the cavity 8 in connection with removal of the ear wax guard.

Corresponding to the flat rectangular form of the end edge surface 19, the pressing-in peak 24 is formed as a four-sided pyramid with a flat rectangular base. The pressing-in peak 24 is dimensioned such that the long side in the base is larger than the diameter of the through-going cavity 8 of the ear wax guard, the pressing depth being limited so that the pressing-in peak 24 is prevented from being pressed too far into the cavity 8 such that the ear wax accumulated in the ear wax guard 6 is not pressed through the guard 9 and into the aid housing 1.

As a consequence of the small dimensions, it is appropriate especially for weak-sighted hearing aid users, if the insertion and removal means comprises an enlargement lens designed to be positioned on the actually used end portion 15 or 16 of the applicator 14.

In a simple embodiment, such an enlargement lens can as shown in FIG. 8 comprise a plano-convex lens 26 in the optical axis of which there is provided a bore 27 suitable for arrangement of the lens on a transition portion 21 or 22 of the applicator 14 in engagement with the intermediate piece 20.

In order to avoid that the end portion 15 or 16 of the applicator 14 extended under the lens during insertion or removal covers the wanted visual field, a bore 28 provided for the attachment of the lens on the applicator 14, as shown in FIG. 9, can in an alternative design be formed in a flange element 29 projecting from the periphery of the lens and forming such an angle with the symmetry plane of the lens 30 perpendicular to the optical axis that the focus of the lens is located immediately outside the free end of the relevant end portion 15 or 16.

Figure 10:
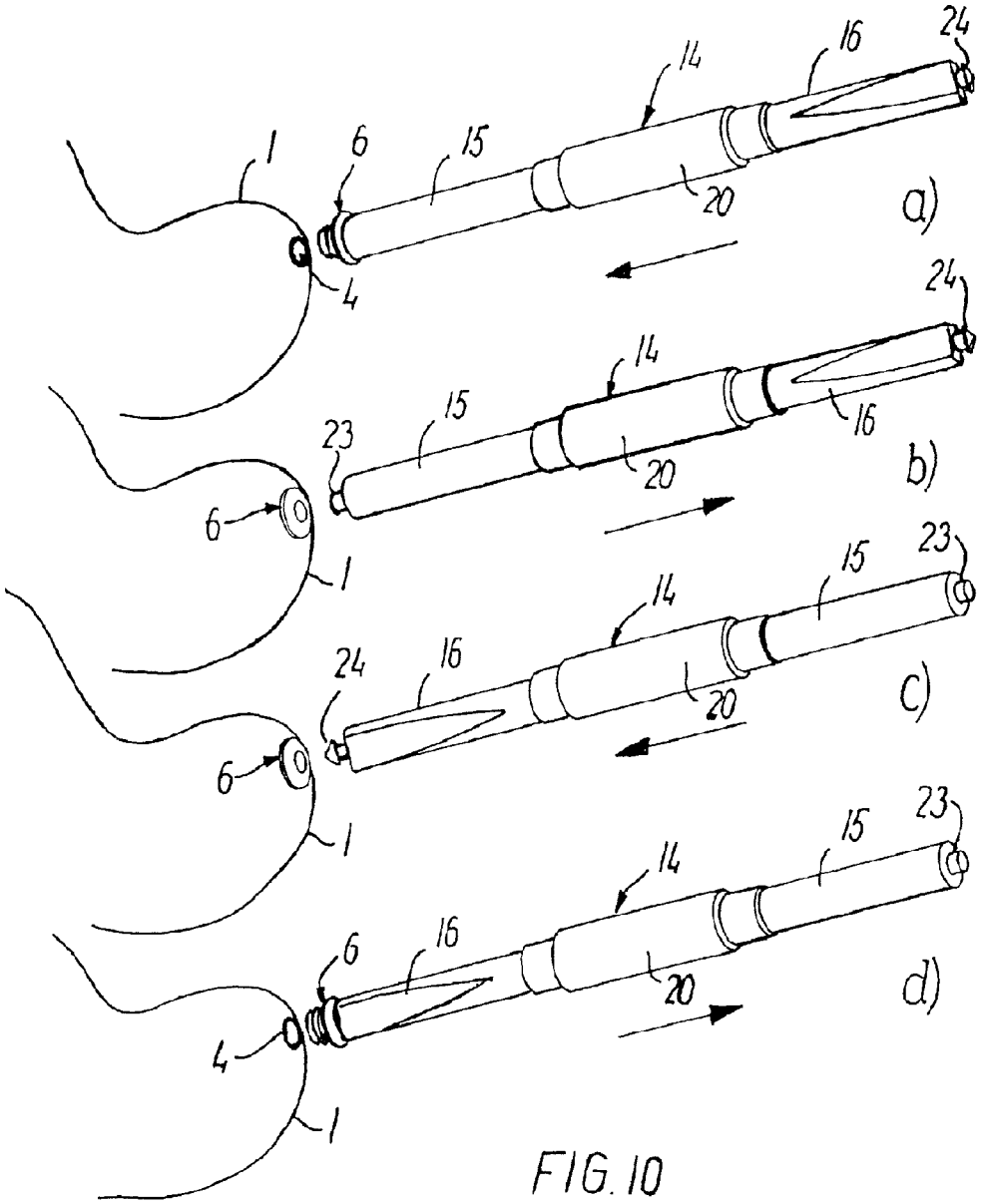

When inserting the ear wax guard, this is placed as shown in FIG. 10a on the smooth pin 23 at the end of the end portion 15 of the applicator 14 and can thus, perhaps by using an enlargement lens as shown in FIG. 8 or 9 easily and securely be guided into the acoustic outlet port 4a and be retained with frictional fit in the acoustic outlet canal 4 formed by the hose member whereupon the applicator is removed as shown in FIG. 10b.

When a quantity of ear wax has been accumulated in the ear wax guard entailing a significant reduction of the sound reproduction of the hearing aid, the ear wax guard can as shown in FIG. 10c be removed by guiding the pressing-in peak 24 of the applicator 14 into the cavity 8 of the ear wax guard until the catch edges 25 enter into engagement with the surrounding wall inner side, the ear wax guard 6 being brought along at the subsequent removal of the applicator as shown in FIG. 10d.

Figure 11:
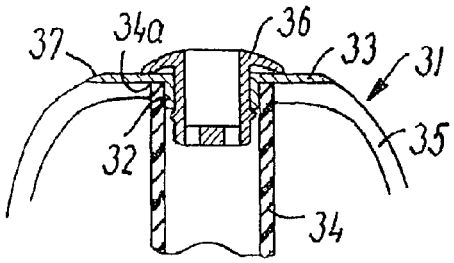
FIG. 11 is a sectional view corresponding to FIG. 2, showing the end part of the housing in an embodiment of a hearing aid especially designed for positioning of the ear wax guard according to the invention.

In the embodiment shown in FIG. 11 of a particularly designed hearing aid according to the invention, the ear wax guard 36 which can be designed as shown in FIG. 3 or 4 is mounted in a bushing 32 with an annular abutment collar 33 in abutment against the outside of the end wall part 35 of the housing portion 31. The bushing 32, which is preferably made of a material with a larger rigidity, e.g., plastics or metal, than both the elastic hose member serving as acoustic outlet port 34 and the ear wax guard, is in this embodiment mounted internally in the hose member 34 such that this is squeezed against the edge side of the acoustic outlet port 34a. The bushing 32 can, e.g., be maintained in the end of the hose member 34 by gluing or welding of the abutment collar 33 to the end wall part 35 and/or it can be inserted with a pressure fit in the hose member 34.

The annular abutment collar 33 and the bushing 32 provide a cylindrical bore for mounting the ear wax guard 36 which can be effected with a means in the form of a rod-shaped applicator as described above with reference to FIGS. 5-10. The abutment collar has in this connection such an inner diameter that it cannot be passed by the abutment faces of the applicator around the pin 23 and the harpoon peak 24.

The periphery edge 37 of the abutment collar 33 is as shown preferably prepared such that a flush transition is obtained between the abutment collar and surrounding outside of the end wall part 35.

By means of the abutment collar 33 which in the shown embodiment is in fixed connection with the hose member 34 through the bushing 32, there is obtained a considerably improved security against unintentional detachment of the hose member 34 from the acoustic outlet port 34a at the mounting or replacement of the ear wax guard 36 by means of an applicator as shown in FIGS. 5-10 with the risk that the hose member 34 is pressed completely into the hearing aid housing 31.

Figure 12:
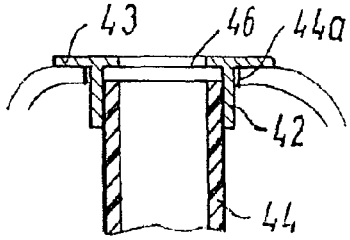
FIG. 12 is a modification of the embodiment in FIG. 11, and FIGS. 13-17 illustrate a method for use in production of the hearing aid according to the invention.

In the modification of this hearing aid design shown in FIG. 12, the mounting bushing 42 is with the abutment collar 43 adapted to be mounted directly in the acoustic outlet port 44a. The hose member serving as acoustic outlet canal can be mounted on the outside of the bushing 42 in the same way as shown in FIG. 11, but alternatively the hose member 44 can as shown be maintained inside the mounting bushing 42. In order to avoid, in this embodiment, the risk of an applicator as shown in FIGS. 5-10 entering into contact with the hose member 44 itself, the abutment collar is preferably provided with a narrowed bore 46 for mounting of the wax guard, preferably with the same diameter as the internal diameter of the hose member 44.

Figure 13:
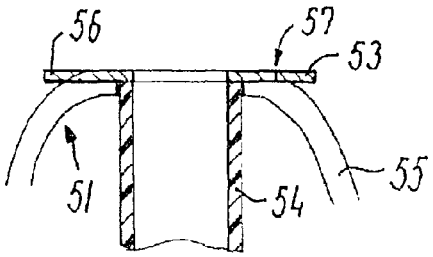

Since the hearing aid housing for in-the-ear hearing aids is usually designed with individual adaptation to the form of the actual user's ear canal, it is in FIG. 13 illustrated how an abutment collar 53 as shown here without a mounting bushing can be obtained by using an abutment collar 53 with overdimensions in relation to the end part 55 of the hearing aid housing 51 and preparation of the periphery edge 56 of the abutment collar 53, firstly by cutting to a suitable diameter as shown by 57 and then by grinding to obtain a flush transition against the outside of the end part 55. Also in the embodiments shown in FIGS. 11 and 12, the bushings 32 and 42 with the abutment collars 33 and 43 can in a corresponding way be manufactured in a standard design with an overdimensioned abutment collar which can be adapted to the end part of the hearing aid housing by preparation in the same way.

Figure 14:
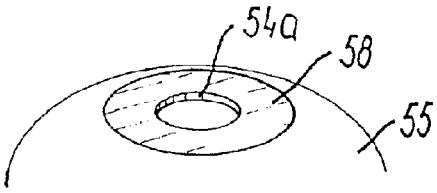

As shown in FIGS. 11-13 it is usually most appropriate, e.g., for cost reasons, that the abutment collar, whether provided with a mounting bushing or for direct connection with the hose member serving as acoustic outlet canal, is designed as a ring disc with a flat underside for abutment against the end part of the hearing aid housing. In this connection, the end part 55 of the hearing aid housing can as shown in FIG. 14 be prepared, e.g., by grinding to produce a flat abutment face 58 for the abutment collar on the mounting bushing.

Figure 15:
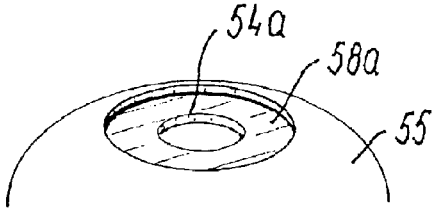

Alternatively as shown in FIG. 15 such a plane abutment face 58a can be designed in a countersunk way by preparing the end part of the housing by milling. Whether the preparation is made by grinding or milling or in another way, the acoustic outlet port 54a in the end part of the housing 55 is used as a guide for a preparation tool designed for this purpose.

Figure 16:
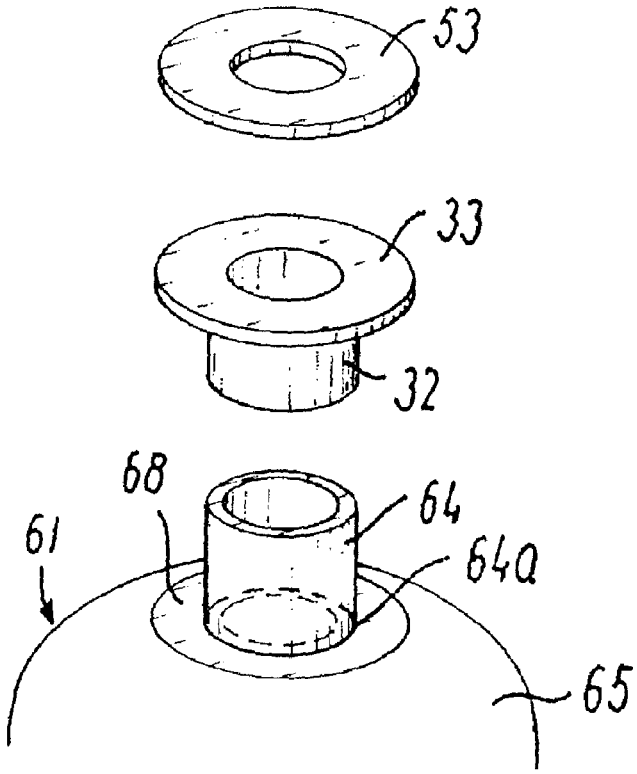

As shown in FIG. 16, at the ready-mounting of a hearing aid in the design according to the invention, a hose element 64 can be used with a surplus length which is guided through the acoustic outlet port 64a in the end part 65 of the housing 61 and fastened hereto by gluing or welding, whereupon the projecting part of the hose member 64 is cut flush with the abutment face 68 formed by preparation of the end part 65 as explained above. By this mounting way, the hearing aid design according to the invention can as shown be provided either in the way that an abutment collar 63 without any mounting bushing is, as shown in FIG. 13, connected directly with the abutment face 68 by gluing or welding, or by insertion of a mounting bushing 32 with an abutment collar 33 with a design as shown, e.g., in FIG. 11 in the end of the hose element 64.

Figure 17:
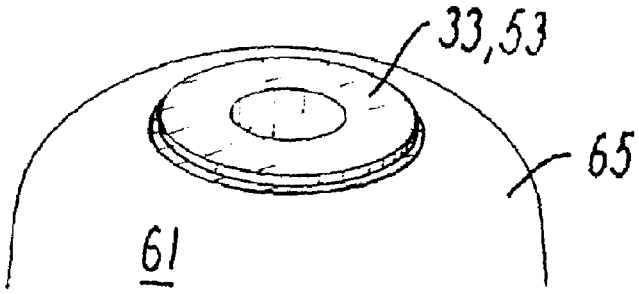

The ready-mounted hearing aid housing 61 with the abutment collar 33 or 53 in abutment against the outside of the end part 65 of the hearing aid housing 61 is shown in FIG. 17.

What is claimed is:

1. An ear wax guard for placement in an opening in a housing wall of a hearing aid, said ear wax guard comprising an essentially tubular element, defining a through-going cavity and adapted for insertion into the opening with a first end of said tubular element being a leading end as said tubular element is inserted into said opening from outside said housing, said element having *a substantially smooth inner wall defining said through-going cavity and having* an ear wax retaining barrier in form of a screen at said first end.

2. The ear wax guard according to claim 1, wherein said screen forms a radial pattern.

3. The ear wax guard according to claim 1, wherein said element at a second end has a collar for sealing abutment against the housing wall.

4. The ear wax guard according to claim 3, wherein said [lip] *collar* is provided with a convex outside and a concave or faintly conical underside such that its peripheral edge forms a sealing lip against the housing wall.

5. [The] *An* ear wax guard [according to claim 1] *for placement in an opening in a housing wall of a hearing aid, said ear wax guard comprising*

*an essentially tubular element, defining a through-going cavity and adapted for insertion into the opening with a first end of said tubular element being a leading end as said tubular element is inserted into said opening from outside said housing, said element having an ear wax retaining barrier in form of a screen at said first end*, wherein said ear wax guard is made of an elastic yielding material.

6. [The] *An* ear wax guard [according to claim 1] *for placement in an opening in a housing wall of a hearing aid, said ear wax guard comprising*

*an essentially tubular element, defining a through-going cavity and adapted for insertion into the opening with a first end of said tubular element being a leading end as said tubular element is inserted into said opening from outside said housing, said element having an ear wax retaining barrier in form of a screen at said first end*, wherein said element is adapted for frictional fitting inside said opening.

7. The ear wax guard according to claim 6, wherein [a] said element comprises *a* circumferential bead providing the frictional fitting.

8. An ear wax guard for placement in an opening in a housing wall of a hearing aid, said ear wax guard comprising an essentially tubular element adapted for frictional fitting inside said opening, defining a through-going cavity and adapted for insertion into the opening, said element having first and second ends with said first end being a leading end as said element is inserted into said opening from outside said housing, said element having an ear wax retaining barrier in form of a screen at said first end and a collar for sealing against the housing wall at a second end, said element being made of an elastic yielding material.

9. The ear wax guard according to claim 8, wherein said screen forms a radial pattern.

10. A method for use in the manufacturing of a hearing aid, comprising providing a hearing aid housing including a housing wall with a housing wall end part, providing in said end part an acoustic outlet port, providing a bushing with an abutment collar with an over-size in relation to said end part, and finishing said abutment collar by preparation of its periphery edge to a flush transition with an outside of said end part.

11. The method according to claim 10, comprising providing in said end part a flat abutment face for said abutment collar.

12. The method according claim 10, comprising providing in said end part a countersunk, flat abutment face.

13. The method according claim 11, comprising fitting inside said housing a hose with a surplus length as acoustic outlet canal, guiding said hose through said acoustic outlet port, cutting the projecting length of said hose flush with said abutment face, and placing said abutment collar directly against said abutment face and the cut end of said hose to obtain a flush transition with said abutment face.

14. The method according claim 13, comprising providing said abutment collar in the form of a flat ring disc, and connecting said ring disc directly with said abutment face.

15. The method according claim 13, comprising press-fitting one end of a tubular mounting bushing of said abutment collar in said hose.

*16. An ear wax guard for placement in a hearing aid, said ear wax guard comprising*

*an element defining a through-going cavity and adapted for insertion into the hearing aid with a first end of said element being a leading end as said element is inserted into said hearing aid, said element being made of a thermoplastic elastomer and having an ear wax retaining barrier at said first end.*

*17. The ear wax guard according to claim 16, wherein said barrier forms a radial pattern.*

*18. An ear wax guard according to claim 16, wherein said element is adapted for frictional fitting inside said hearing aid, said element having said first end and a second, said element having a collar for sealing against the hearing aid at a second end, and said element being made of an elastic yielding material.*

*19. An ear wax guard according to claim 16, wherein said element is adapted for frictional fitting inside an opening in a wall of said hearing aid, said element having a collar made of a resilient material and having a reduced thickness lip at its outer periphery for sealing against the housing when said element is inserted into said opening.*

*20. The ear wax guard according to claim 19, wherein said barrier forms a radial pattern.*

*21. An ear wax guard according to claim 16, wherein said element is essentially tubular and is adapted for insertion into an opening in a wall of said hearing aid, said element further having a lip at least partially surrounding said tubular element for abutting the housing wall when said wax guard is inserted, said lip having a reduced thickness outer peripheral edge for resiliently engaging said housing wall.*

*22. A method for manufacturing a hearing aid, comprising*

*providing a hearing aid housing including a housing wall with a housing wall end part with an acoustic outlet port therein,*

*providing an abutment surface surrounding said outlet port, and*

*finishing said abutment surface by preparation of its peripheral edge to a flush transition with an outside of said housing wall.*

*23. A method for manufacturing a hearing aid, comprising*

*providing a hearing aid housing including a housing wall with a housing wall end part with an acoustic outlet port therein,*

*providing an abutment surface surrounding said outlet port, said abutment surface at least at its outer periphery being flush with an exterior surface of said housing wall.*

*24. A method according to claim 23, further comprising the step of providing an inwardly projecting portion that projects inwardly from the housing wall at said acoustic outlet port for connection to a sound tube.*

*25. A method according to claim 23, wherein said housing is of a form adapted to an individual user's ear canal.*

*26. A method according to claim 23, wherein said step of providing said abutment surface includes using said acoustic outlet port as a tool guide.*

*27. A method according to claim 22, wherein said abutment surface comprises an abutment collar with an over-size in relation to said end part.*

* * * * *